No. 715,236. Patented Dec. 9, 1902.
G. BAEHR.
BOOSTER SYSTEM.
(Application filed Feb. 14, 1902.)
(No Model.)
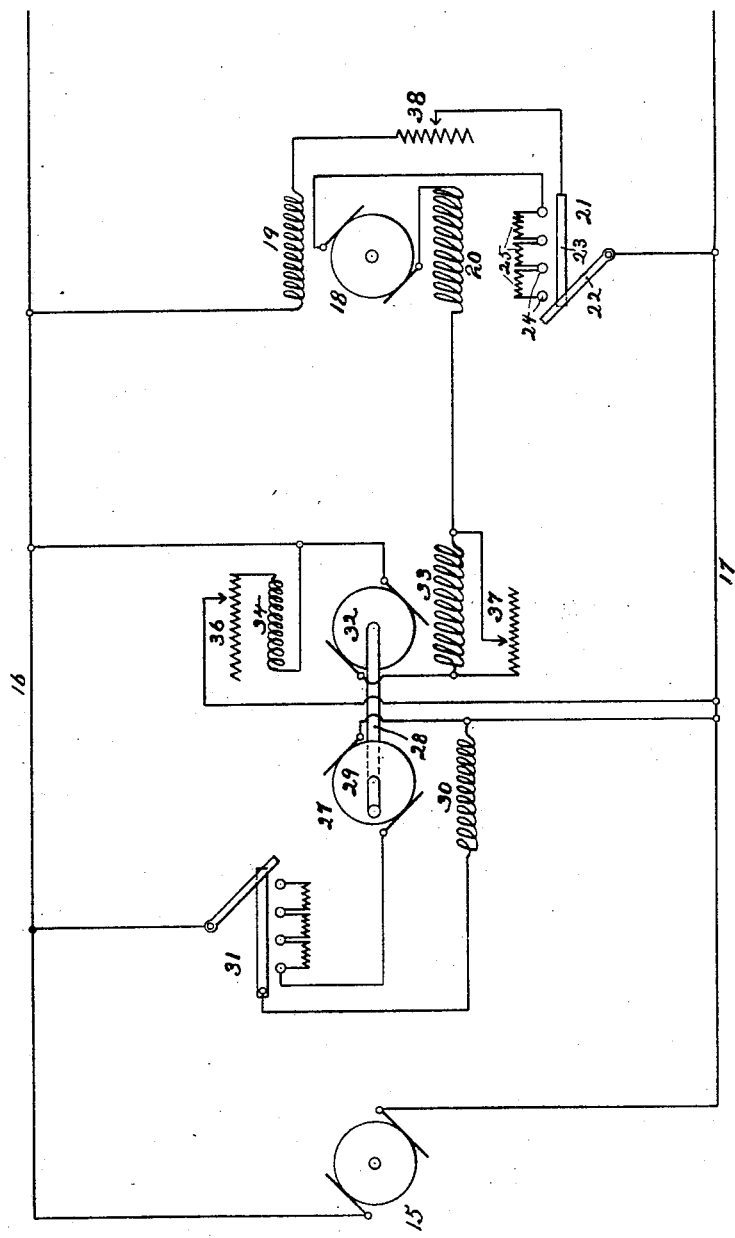
Witnesses:
Inventor:

UNITED STATES PATENT OFFICE.

GEORGE BAEHR, OF McKEESPORT, PENNSYLVANIA, ASSIGNOR TO NATIONAL TUBE COMPANY, OF PITTSBURG, PENNSYLVANIA, A CORPORATION OF NEW JERSEY.

BOOSTER SYSTEM.

SPECIFICATION forming part of Letters Patent No. 715,236, dated December 9, 1902.

Application filed February 14, 1902. Serial No. 94,122. (No model.)

*To all whom it may concern:*

Be it known that I, GEORGE BAEHR, a resident of McKeesport, in the county of Allegheny and State of Pennsylvania, have invented a new and useful Improvement in Booster Systems; and I do hereby declare the following to be a full, clear, and exact description thereof.

My invention relates to electrical generating and translating systems; and its object is to provide a system of this kind whereby the voltage and amperage of the current generated and used is automatically regulated to correspond to the load thrown upon the motor or other translating device.

More specifically stated, the object of my invention is to provide a system of this character which is adapted to drive a motor at a given speed when running idle or under a friction or light load and at greater speed when running under a heavier load, the current for producing this effect being automatically controlled.

In many industrial plants the machines are used intermittently, and the nature of the work is such that when the load is put on the machine, or, in other words, when the material to be operated upon is presented to the machine, the latter should not exceed a certain speed; otherwise it is difficult to handle the work, and there is also liability of damaging the same. It frequently occurs, however, that after the work has been begun the machine can be considerably speeded up without detrimentally affecting the work, and sometimes with the effect of improving it. If a constant-speed or constant-current motor be employed for driving such machines, the quantity of current consumed will of course be automatically regulated by the load on the machine, and the counter electromotive force generated when the machine is running idle will keep the speed of the motor substantially uniform; but when the load is thrown on the machine the speed of the motor will slightly decrease, although, theoretically, it is presumed to remain constant. By the use of such motors and an ordinary generating system the motor will not be speeded up after the load has been thrown on the machine unless some manual means be employed—such, for instance, as cutting out a resistance or weakening the field of the motor. The former, however, is wasteful of current, and the latter decreases the torque of the motor.

The object of my invention is to provide an electrical system whereby a machine of the character described will when idle or under a friction load run at a comparatively slow speed and without wastage of current, but whereby when the load is thrown on said machine the current will be automatically increased both in voltage and amperage, so that the machine is speeded up.

My invention further consists in certain details of arrangement of the system, as will hereinafter appear.

The accompanying drawing shows diagrammatically one arrangement of my booster system.

In the drawing the main generator is shown at 15, and this may be of any of the well-known types, preferably a constant-current generator. To the terminals of this generator are connected the power-mains 16 and 17. The translating device of the system may be represented by a motor whose armature is shown at 18, and this will be connected by suitable gearing to the machine or machines to be driven. The field of this motor is preferably compound wound, although this is not absolutely essential, as a shunt-wound motor would answer for some purposes. The shunt-winding is shown at 19 and is connected across the power-mains, as shown. The series winding of the field is shown at 20 and has one terminal connected to one of the armature-brushes, while the other terminal is connected to the motor-generator or booster, as will be hereinafter described. The motor is connected to the power-mains by any suitable switch or starting device, one suitable for this purpose being shown at 21, the same comprising a switch arm or blade 22, connected to the power-main 17 and adapted to pass onto a contact-strip 23, connected to the shunt-field 19, and also pass over contact-pieces 24, which are separated by a resistance agency, such as coils of fine wire 25, and connected to the armature 18 of the motor. The strip 23 is of such length that when the switch-arm 22 is moved to close the circuit the field 19 will be first energized and brought to its full strength before the circuit through the armature is closed, and as the switch-arm 22 is moved along the resistance 25 is gradually cut out, thus gradually increasing the current through the armature and avoiding injury to the same.

The booster or motor-generator is shown at 27, and this may be of any approved type of motor-generator, preferably having the motor and generator directly coupled, as by means of the shaft 28. The motor-armature is shown at 29 and the motor-field at 30. This motor is connected across the power-mains, as shown, and in the circuit is placed a suitable switch or starting device 31, which may be of any approved form and is shown of the same construction as the starting device 21 in the primary-motor circuit.

The generator-armature of the booster is shown at 32, and the field is preferably of a different type, composed of two windings 33 and 34. The former is of large wire and large current-carrying capacity and is in series with the generator-armature 32 and with the series winding 20 and armature 18 of the primary motor. The other field-winding 34 is of small wire and correspondingly small current-carrying capacity and wound in a direction opposite to the winding of the field 33, and it is connected across the power-mains, as shown. Suitable means will be provided for regulating the strength of each of these fields, and this is most conveniently accomplished by putting in the field-circuits variable resistance devices, (shown diagrammatically at 36 and 37.) The variable-resistance device 36 in the circuit of the shunt or differential field 34 is in series therewith, while the variable resistance 37 in the circuit of the series field 33 is in parallel therewith, although these arrangements may be varied, if desired or necessary. A variable-resistance device is also preferably put in the circuit of the shunt-winding 19 of the primary motor, as shown at 38, so that the strength of the field of said motor can be varied. Should it be desired to increase the speed of the motor above that given by the booster, this resistance device is adjusted to weaken the field 19, thus giving the increased speed to the armature 18.

The operation of this system is as follows: We will assume that the main generator 15 is operating in the usual manner and that the circuits through both the primary motor or other translating device and the booster 27 have been closed by suitably moving the switches 21 and 31. Current from the power-main 16 will then flow through both the shunt and series windings 19 and 20 of the primary motor and cause rotation of the armature 18 thereof in the well-understood manner. The current flowing through the armature 18 and series field 20 also flows through the series field 33 and armature 32 of the generator of the booster, as will be seen by tracing the circuits. Current will also be flowing through the motor of the booster, thereby rotating said motor and the armature 32 of the generator. Current will also be flowing through the shunt-winding 34 of this generator; but the variable resistances 36 and 37 will have been so adjusted that when the motor 18 is running idle or under a friction load or, more strictly speaking, at its desired lower speed, the ampere-turns of the two field-windings 33 and 34 will be the same, and as they work in opposition they will neutralize each other. As a consequence, no magnetism will manifest itself at the ends of the pole-pieces, and no current will be generated by the armature 32; but said armature will merely rotate idly and will not interfere with the flow of the current through the same to the series field 20 of the primary motor. As soon as the load or the additional load, as the case may be, is thrown on the primary motor it will tend to decrease the torque of the armature 18, thereby decreasing the counter electromotive force and permitting more current to flow through said armature, which current must necessarily come by way of the series field 33 of the motor-generator, so that said field 33 is increased in strength, while the oppositely-wound field 34 remains of the same strength. As a consequence the field becomes overbalanced, or, more strictly speaking, a magnetic field is established, so that the rotation of the armature 32 in this field will generate additional current, and this current, with the connections shown, must flow through the series field 20 and armature 18 of the primary motor, thus increasing both the voltage and the amperage flowing through said field and armature and correspondingly increasing the torque and speed of said motor. As long as this load or additional load remains on the motor 18 the extra current will be generated by the booster and transmitted to strengthen the field and armature of the primary motor, thereby maintaining the higher speed of this motor during the continuance of the load. As soon, however, as the load is taken off this motor the current flowing through the motor furnishes an excess of torque, which momentarily causes the speed to increase, thus increasing the counter electromotive force and decreasing the current flowing through the armature 18 and the series field 33 of the booster. As a consequence, the fields of this motor-generator will again neutralize each other and stop the generation of current thereby, and the primary motor will drop back to its normal or slow speed. The shunt-winding 19 of the primary motor prevents the armature 18 from racing when the load is taken off, as would be the case if only the series winding 20 were used. This is well understood by those skilled in the art and need not be further described.

It will be observed that by the use of my system the primary motor will run at one speed when under a friction or light load and at an increased speed when under a heavier load and that this regulation takes place automatically and without any manual manipulation. It will be understood, of course, that all the details of arrangement shown are not necessary; but these may be varied within limits without disturbing the effect produced. For instance, a single source of current, such as the generator 15, need not be employed, as separate sources of current might be used for the primary motor and for the booster-motor, if desired. Furthermore, this booster need not be of the motor-generator type, as shown, as an engine-driven generator whose fields are excited from an outside source of current would give the same effect. So, too, the series winding 20 of the primary motor is not absolutely essential, as a shunt-wound motor can be used. In that case the series field 33 of the booster will be connected directly to the armature 18 of the primary motor. For convenience and efficiency, however, the arrangement shown in the drawing is preferred. The main generator 15 will of course be located at any desired point, and the booster 27 will preferably be located in proximity to the translating circuit or device, and when the translating device is a motor, as shown, the booster will be in proximity to the machine driven by the primary motor or just outside of the shop or mill in which the latter is located. The primary motor will of course be located as close as convenient to the machine to be driven.

What I claim as my invention, and desire to secure by Letters Patent, is—

1. In an electric-booster system, the combination with a motor, of a source of current therefor, and automatic means for increasing the amperage and voltage of the current at the motor-terminals in proportion to the increase of the load on the motor.

2. In an electric-booster system, the combination with a motor, of a source of current therefor, and means controlled by an increase of the load on the motor for increasing in like proportion the amperage and voltage of the current at the terminals of the motor.

3. In an electric-booster system, the combination with a motor, of a source of current therefor, and a booster, the field of which is established by current flowing to the motor in excess of a predetermined amount.

4. In an electric-booster system, the combination with a motor having a shunt-winding, of a generator supplying current for said motor, and a source of current for exciting the field of said generator, said field being in series with the armature of the motor whereby an increase in the load on the motor will cause a proportionate increase in strength of the generator-field.

5. In an electric-booster system, the combination with a motor having a shunt-winding, of a generator having a differentially-wound field, and a source of current for exciting said generator-fields, one of said generator-fields being in series with the armature of the motor whereby an increase in the load on the motor will cause a proportionate increase in strength of the generator-field.

6. In an electric-booster system, the combination with a motor, of a generator supplying current therefor, said generator having a differentially-wound field, one of said windings being in series with the motor-armature and said fields being so proportioned as to neutralize each other when the motor is running under a friction or light load, and a source of current for exciting said generator-fields.

7. In an electric-booster system, the combination with a motor, of a generator having two field-windings of different carrying capacities and wound in opposite directions, the larger of said field-windings being in series with the armature of the motor and said windings being so proportioned as to neutralize each other when the motor is running under a friction or light load, and a source of current for exciting said generator-fields.

8. In an electric-booster system, the combination with a motor having a shunt-winding, of a generator having two field-windings oppositely wound, one of said windings being in series with the armature of the motor and said windings being so proportioned as to neutralize each other when the motor is running under a friction or light load, and a source of current for exciting said generator-fields.

9. In an electric-booster system, the combination with a motor, of a generator having two field-windings of different carrying capacities and oppositely wound, the smaller of said windings being in shunt with the generator-armature and the other of said windings being in series with the generator-armature and with the motor-armature, said windings being so proportioned as to neutralize each other when the motor is running under a friction or light load, and a source of current for exciting said generator-fields.

10. In an electric-booster system, the combination with power-mains, of a motor having a shunt-winding connected across said mains, and a booster having a differentially-wound field, one of said windings being connected across said mains and the other being in series with the generator-armature and with the motor-armature, said windings being so proportioned as to neutralize each other when the motor is running under a friction or light load.

11. In an electric-booster system, the combination with power-mains, of a motor having a shunt-winding connected across said mains, and a motor-generator having its motor connected across said mains and its generator having two field-windings of different carrying capacities and wound in opposite directions, the smaller of said windings being connected across said mains and the larger of said windings being in series with the generator-armature and with the motor-armature, said windings being so proportioned as to neutralize each other when the motor is running under a friction or light load.

12. In an electric-booster system, the combination with a compound-wound motor, of a source of current for the shunt-winding thereof, a generator having a series field and its armature in series with the series winding and armature of the motor, and a source of current for the field of said generator.

13. In an electric-booster system, the combination with a compound-wound motor, of a source of current for the shunt-winding thereof, a generator having a differentially-wound field, one of said windings being in series with the series winding and armature of the motor, and a source of current for exciting said generator-field.

14. In an electric-booster system, the combination with a compound-wound motor, of a source of current for the shunt-winding thereof, a generator having two field-windings of different carrying capacities and wound in opposite directions, the larger of said field-windings being in series with the series winding and armature of the motor, and a source of current for exciting said generator-fields.

15. In an electric-booster system, the combination with a compound-wound motor, of a source of current for the shunt-winding of said motor, a variable resistance in the circuit of said shunt-winding, a generator having two field-windings oppositely wound, one of said windings being in series with the series winding and armature of the motor, and a source of current for exciting said generator-fields.

16. In an electric-booster system, the combination with a compound-wound motor, of a source of current for the shunt-winding of said motor, a generator having two field-windings oppositely wound, one of said windings being in shunt with the generator-armature, and the other being in series with the generator-armature and with the series winding and armature of the motor, variable resistances in circuit with the generator-field windings, and a source of current for exciting said generator-fields.

17. In an electric-booster system, the combination with power-mains, of a compound-wound motor, the shunt-winding of which is connected across said mains, and a booster having a differentially-wound field, one of said windings being connected across said mains and the other being in series with the generator-armature and with the armature and series winding of the motor.

18. In an electric-booster system, the combination with power-mains, of a compound-wound motor, the shunt-winding of which is connected across said mains, and a booster having two field-windings of different carrying capacities and wound in opposite directions, the smaller of said windings being connected across said mains and the larger of said windings being connected in series with the generator-armature and with the armature and series winding of the motor.

19. In an electric-booster system, the combination with power-mains, of a compound-wound motor, the shunt-winding of which is connected across said mains, and a motor-generator having its motor connected across said mains and its generator having two field-windings oppositely wound, one of said windings being in shunt with the generator-armature and connected across said mains and the other being in series with the generator-armature and with the series winding and armature of the motor.

20. In an electric-booster system, the combination with power-mains, of a compound-wound motor, the shunt-winding of which is connected across said mains, and a motor-generator having its motor connected across said mains, and its generator having two field-windings of different carrying capacities and wound in opposite directions, the smaller of said windings being connected across said mains and in shunt with the generator-armature and the larger of said windings being in series with the generator-armature and with the series winding and armature of the motor.

In testimony whereof I, the said GEORGE BAEHR, have hereunto set my hand.

GEORGE BAEHR.

Witnesses:
F. W. WINTER,
ROBERT C. TOTTEN.